Nov. 26, 1968    A. C. KALETKA ETAL    3,412,609
LIQUID LEVEL INDICATION

Filed July 19, 1967    2 Sheets-Sheet 1

INVENTORS
Albert C. Kaletka, John R. Martinec,
Charles F. Kummer & Joseph F. Sucic.
BY
F. E. Browder
ATTORNEY United States Patent Office 3,412,609
Patented Nov. 26, 1968

3,412,609
LIQUID LEVEL INDICATION
Albert C. Kaletka, Sharon, Pa., John R. Martinec, Hubbard, Ohio, and Charles F. Kummer, Sharpsville, and Joseph F. Sucic, Greenville, Pa., assignors to Westinghouse Electric Corporation, Pittsburgh, Pa., a corporation of Pennsylvania
Filed July 19, 1967, Ser. No. 654,542
8 Claims. (Cl. 73—308)

ABSTRACT OF THE DISCLOSURE

Apparatus for giving a continuous indication of the liquid level in a casing where a float-arm member is pivotally mounted to a plate member in the casing and will move an overlying arm having a permanent magnet attached thereto in response to liquid levels. A permanent magnet follower may also operate switch means provided therein to operate a warning signal when high or low liquid levels are reached.

Electrical inductive apparatus such as transformers, reactors and switchgear apparatus is conventionally mounted in a container or casing and the container or casing is filled with a liquid dielectric cooling medium, such as oil or other suitable dielectric material. With such apparatus some means must be provided for indicating the liquid level in the casing, for if the liquid level gets too low the apparatus will overheat and destroy itself. Prior art methods for indicating liquid level in such a casing comprise slight gauges, dipsticks and rotary motion calibrated gauges. These methods are expensive and are sources of trouble because the indicating device extends through the casing containing the liquid. This presented problems in providing liquid tight seals, which are expensive.

Accordingly, it is an object of this invention to provide a new and improved liquid level indicator for indicating the level of liquid in a casing wherein no moving parts extend through the casing.

Another object of this invention is to provide a new and improved liquid level indicator for indicating the liquid level in a casing comprising a float operated permanent magnetic member in the casing which operates a permanent magnetic follower member on the outside of the casing to indicate the liquid level in the casing.

Further objects and advantages of this invention will become apparent from the following detailed description, taken in connection with the accompanying drawings, in which.

Figure 1:
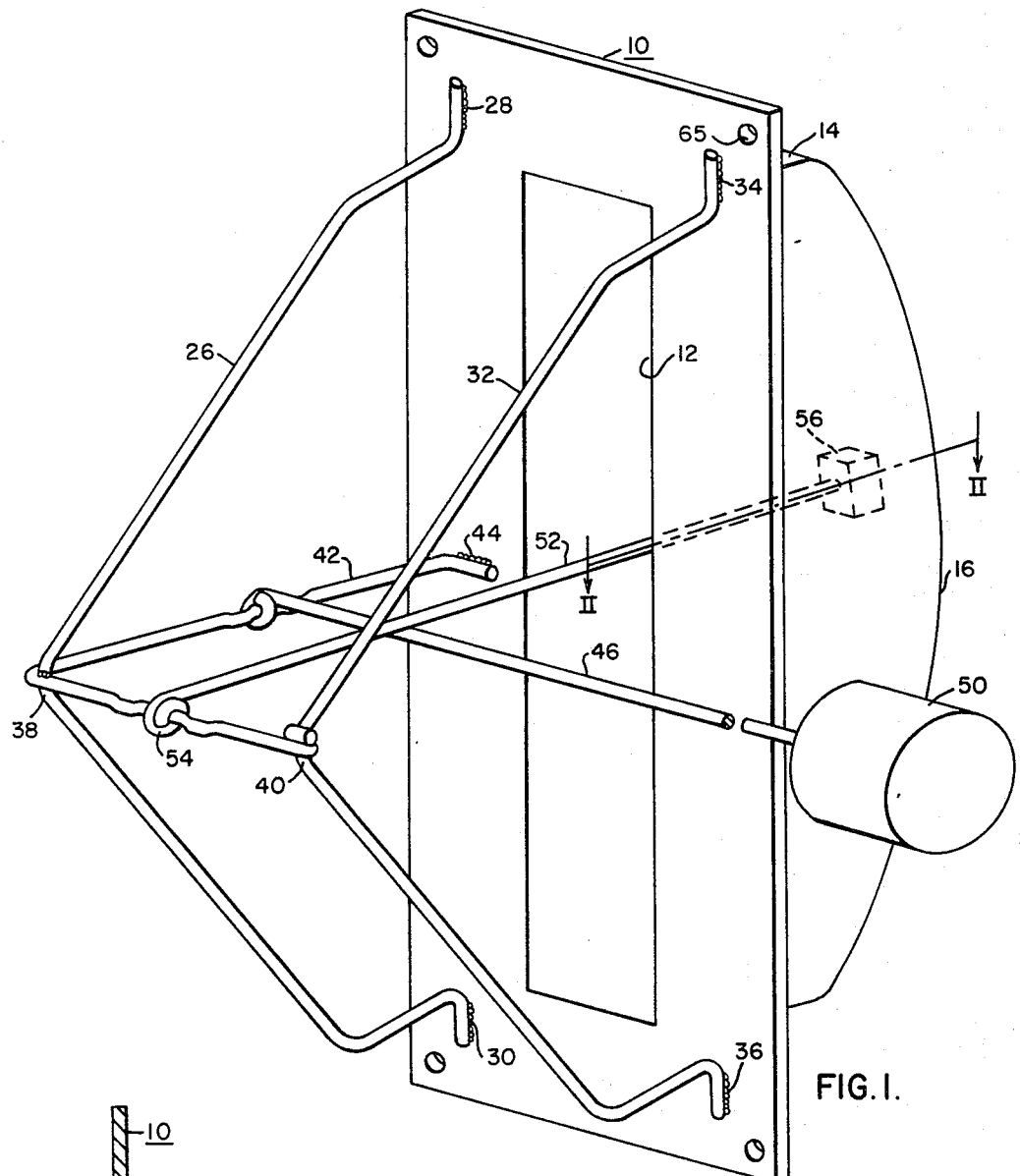
FIGURE 1 shows a partial perspective view of the liquid level indicator provided by this invention.
Figure 2:
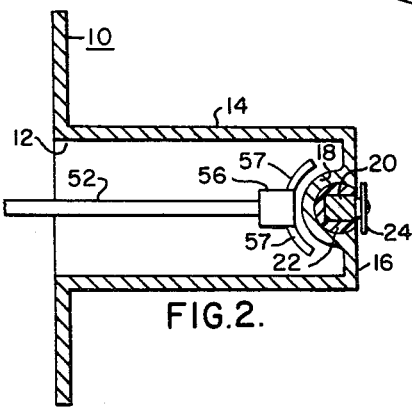
FIG. 2 is a partial sectional view taken along line II—II of FIGURE 1 illustrating the protruding non-magnetic cover and the relative positions of the float operated permanent magnetic member and the permanent magnetic follower member.

Referring specifically to the drawings, FIG. 1 is a partial perspective view of a liquid level indicator provided by this invention. The liquid level indicator of FIG. 1 comprises a mounting plate 10 having an opening or aperture 12 therein. The aperture or opening 12 is covered by a protruding non-magnetic cover member 14. The cover 14 is sealed to the front side of the plate 10 around the opening 12 to provide a liquid tight seal. The protruding cover 14 is made of some non-magnetic material such as copper, brass, bronze, magnesium, aluminum, stainless steel, or a suitable plastic. The front surface 16 of the cover 14 is curved and comprises substantially an arc of a circle. As more clearly shown in FIG. 2 the front surface 16 of the cover 14 has a groove 18 therein. This groove receives a permanent magnet follower member 20. The permanent magnet follower 20 is encased in a resin composition such as epoxy, Teflon or other suitable resin 22. The permanent magnet follower 20 moves up and down in the groove 18 to indicate on the outside of a casing the level of a liquid in the casing, as will be explained hereinafter. The permanent magnet follower 20 also carries a pointer 24 which indicates the liquid level in the casing against indicia provided exteriorly of the casing. The permanent magnet follower 20 may be made of a ferrite, alnico or some other permanent magnet material.

A first frame member or bracket 26 is attached to the rear of the mounting plate 10. The first frame member 26 is of substantially V-shape and it is attached to the mounting plate 10 at points 28 and 30 by some means such as welding or brazing or the like. A second V-shape frame member 32 is also attached to the rear face of the plate 10 and extends therefrom substantially parallel to the first frame member 26. The second frame member or bracket 32 is attached to the plate and at points 34 and 36 by some suitable means such as welding, brazing or the like. It is seen that the two substantially V-shaped frame or bracket members 26 and 32 extend substantially parallel to each other and have their apexes or bottoms of the V's 38 and 40 substantially in the same horizontal plane.

A third bracket or frame member 42 is attached to the rear side of the mounting member 10 at 44 by welding, brazing or some other suitable means and is also attached to the first frame member 26 at the apex 38 of the V in the frame member 26 and to the second frame member 32 at the apex 40 of the V in the frame member 32. The purpose of this third bracket or frame member 42 is to provide rigidity for the first frame member 26 and second frame member 32, and also provide a substantially horizontal support for the moving parts of the liquid level indicator. An arm 46 is pivotally attached to the third frame member 42 at a point substantially midway between points 38 and 44 and extends therefrom. A float member 50 is carried at the end of the pivoted arm 46.

A second arm 52 is pivotally attached to the third bracket member 42 at a point 54, substantially midway between the apex or V-38 of the first frame member 26 and the apex or V-40 of the second frame member 32. The pivoted arm 52 extends through the aperture 12 in the mounting plate 10 and carried adjacent its end a permanent magnet member 56. This magnet member 56 may be any of the commercially available permanently magnetized material such as the ferrite or alnico materials commercially available on the market. This magnetic material may be of the same type as the moving follower magnet 20 described hereinbefore.

Figure 3:
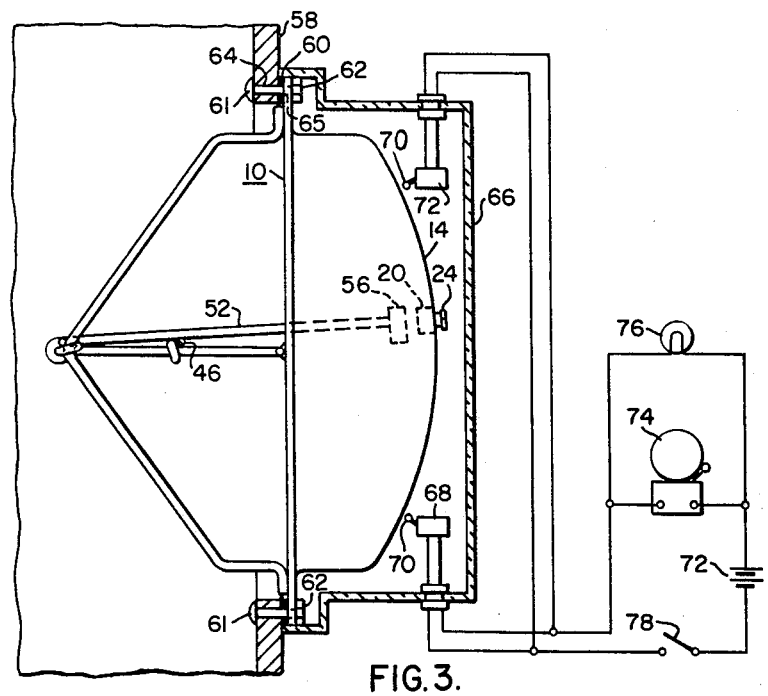
FIG. 3 is a side view, partially in section illustrating the liquid level indicator of this invention attached to a casing containing a liquid; and, FIG. 4 is a front elevational view of the liquid level indicator of FIG. 3, partially in section, illustrating a cover having indicia thereon for indicating the liquid level corresponding to the position of the permanent magnet follower member.
Figure 4:
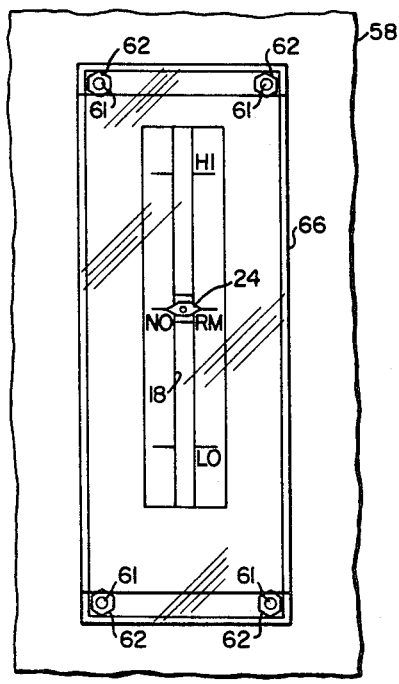

Referring to FIGURE 3 which shows a liquid level indicators as provided by this invention mounted on a tank or casing 58. The tank 58 may be the container for electrical induction apparatus such as a transformer, switchgear or a reactor or the like. With this type of apparatus the tank 58 is usually filled with some dielectric cooling medium such as oil. It is important that the level of the oil in the tank 58 be maintained at a certain minimum level in order to properly protect the electrical apparatus in the tank 58. As seen from FIG. 3 the liquid level indicator is attached to the walls of the tank 54 by means of gaskets 60 and bolts 61. The bolts 61 pass through holes 64 in the tank wall and holes 65 in the mounting plate 10 of the liquid level indicator. Nuts 62 are provided for drawing the plate 10 tightly up against the gasket 60 to provide a liquid tight connection between the tank wall and the plate 10.

FIGURE 3 also illustrates a transparent cover 66 which fits over the protruding non-magnetic covering 14. The transparent cover 66 has indicia indicated thereon to indicate the high-normal-low levels of liquid in the casing 58.

Also at the lower end of the cover 66 there is provided a switch 68 having a circuit opening and closing member 70. As the liquid level in the casing 58 approaches its lower level the permanent magnet 20 will operate the circuit opening and closing member 70 of the switch 68 to close the circuit of a power source 72 to energize a bell 74 and a light 76, to call to the attention of an attendant that the liquid in the casing is approaching a dangerous low level, and also to give a visual indication of the particular casing involved in installations where the particular casing is one of many pieces of apparatus mounted in a bank. A similar switch 72 is provided near the top of travel of the follower magnet 20. When the liquid level reaches its high level the magnet 20 operates the circuit opening and closing member 70 of the switch 72 to energize the bell 74 and the light 76 and likewise warns an attendant that the liquid level in the casing is high.

In the operation of the liquid level indicator as provided by this invention, as the liquid level in the casing 58 rises the float 50 will also rise, along the with the liquid level. As seen from FIGS. 1 and 3 the pivoted arm 52 carrying the permanent magnet 56 is positioned on top of the float arm 46 and substantially perpendicular thereto. Therefore as the float moves up and down and it will move the arm 52 carrying the permanent magnet 56 up and down accordingly. Movement of the pivoted arm 52 up by the float, or down by gravity as the float lowers due to the lowering of the liquid level in the casing, moves the permanent magnet 56 along the curved surfaces 16 of the protruding housing 14. The permanent magnet 56 has attached thereto a pair of guide arms 57, shown in FIG. 2, which assures that the permanent magnet 56 will follow the groove 18 in which the follower magnet 20 is located. Since the permanent magnet follower 20 is located in the groove 18 in the protruding cover of the cover 14, the permanent magnet follower 20 will follow the movement of the permanent magnet 56 along the groove 18 in the protruding housing 14. Since the transparent housing 66 having indicia thereon is directly in front of the follower magnet 20, the permanent magnet follower 20 will indicate against the translucent casing 66, the condition of the oil level or other liquid level in the casing 58.

In case the liquid level in the casing becomes dangerously low the permanent magnet follower 20 will operate the circuit opening and closing mechanism 20 of the switch 68 to energize the power supply 72 to cause the bell 74 to give an audible alarm and the light 76 to give a visual indication of the particular unit in which the liquid level has become dangerously low. The circuit including the switch 68 and the power source 72 is also provided with an auxiliary circuit opening and closing device 78 to permit the power source 72 to be disconnected from the switches 68 and 72 in case the unit requires removing the liquid from the casing 58 for servicing or the like. Likewise, when the liquid level in the casing 58 reaches the high level, the upper switch 72 is closed to give a visual and audible alarm to alert an attendant.

From the foregoing it is seen that this invention has provided a very simple and economical liquid level indicator for accurately indicating the liquid level in a container which is reliable and which has no moving parts extending exteriorly of the container. This device provides an accurate and dependable liquid level indicator which does not require any complicated seals for sealing movable devices through the walls of the container. This is very important since apparatus of the type on which this indicator is used is usually in service for long periods of time and it is expensive and troublesome to provide seals for moving parts extending through a container containing a liquid. This device also provides an economical and dependable device for indicating the liquid level in the container at all times and also for giving an audible visual signal to an attendant when the liquid level in the container reaches the high level or a dangerously low level.

We claim:

1. An indicator for indicating at a point outside of a casing the level of liquid inside said casing, said indicator comprising a mounting member for mounting said indicator on the casing, said mounting member having an opening therein, a protruding non-magnetic cover member attached to said mouting member and covering said opening, first and second bracket members each being attached at two points to said mounting member, a third bracket member attached at one point to said mounting member and to each of said first and second bracket members, an arm pivotally attached to said third bracket member and carrying a float, an arm pivotally attached to one of said bracket members and carrying a first permanent magnet member, said arm carrying said first permanent magnet member being above said arm carrying said float and lying across said arm carrying said float in such a manner that when said float moves said first permanent magnetic member moves in the same direction as said float, said arm carrying said first permanent magnet member extending through said opening in said mounting member and protruding into said housing so as to position said first permanent magnet member adjacent the curved surface of said protruding housing, a permanent magnet follower member movably mounted on said protruding non-magnetic cover member on the side opposite to said first permanent magnet member, said permanent magnet follower member being influenced by movement of said first permanent magnet member to move with said first permanent magnet member and indicate exteriorly of said protruding cover member the liquid level inside said casing.

2. The liquid level indicator as specified in claim 1 wherein said first and second brackets are V-shaped and both legs of each V is attached to said mounting member, and said third bracket member is attached to said mounting member and to the apex of each of said first and second V-shaped bracket members.

3. A liquid level indicator as claimed in claim 1 wherein said first and second bracket members are substantially V-shaped and both legs of each V attached to said mounting member, with the third bracket member attached to said mounting member and each of the apexes of said first and second V-shaped bracket members, with a float arm pivotally mounted to said third bracket member between said mounting member and the apex of the V of said first bracket member, and an arm carrying a first magnetic member attached to said third bracket member at a point located between the apexes of said first and said second V-shaped bracket members, with the arm carrying said first magnetic member being above said float arm and substantially traverse thereto.

4. The liquid level indicator as claimed in claim 1 having a translucent cover positioned over said protruding non-magnetic cover, said translucent cover having indicia thereon for indicating the level of liquid in said casing corresponding to the position of said permanent magnet follower member.

5. A liquid level indicator as claimed in claim 1 wherein switch means is located adjacent the upper and lower end of travel of said permanent magnet follower member, said switch means being moved to close position by said permanent magnet follower member to actuate means for giving a signal to indicate the upper and lower levels of liquid in said casing.

6. A liquid level indicator as claimed in claim 1 wherein switch means is located adjacent the lower end of travel of said permanent magnet follower member, said switch means being moved to close position by said permanent magnet follower member to actuate means for giving a signal to indicate the lower level of liquid in said casing.

7. The liquid level indicator as claimed in claim 1 wherein switch means is located adjacent the lower limit of travel of said permanent magnet follower member, said switch means being operated by said permanent magnet follower member to give a visual and audible warning of a low level of liquid in said casing.

8. The liquid level indicator as claimed in claim 1 wherein said protruding non-magnetic housing has a groove formed in the curved surface thereof, said permanent magnet follower member having a plastic coating thereon, said permanent magnetic follower member being positioned in said groove in said curved surface of said protruding cover member and said plastic coating of said permanent magnetic follower member providing a lubricant to cause said permanent magnetic follower member to move easily in said groove.

References Cited

UNITED STATES PATENTS

| 1,858,346 | 5/1932 | Straughan | 73—290 |
| 2,120,825 | 6/1938 | Wolfert | 340—244 |
| 2,717,934 | 9/1955 | Collins | 200—84 |
| 3,240,388 | 3/1966 | Brainard | 73—308 X |

FOREIGN PATENTS

| 1,173,167 | 7/1964 | Germany. |

S. CLEMENT SWISHER, *Acting Primary Examiner.*

D. M. YASHISH, *Assistant Examiner.*